April 22, 1924.  
J. A. NY  
1,491,491  
MECHANICAL MOVEMENT FOR INKING ROLLS  
Filed April 12, 1922
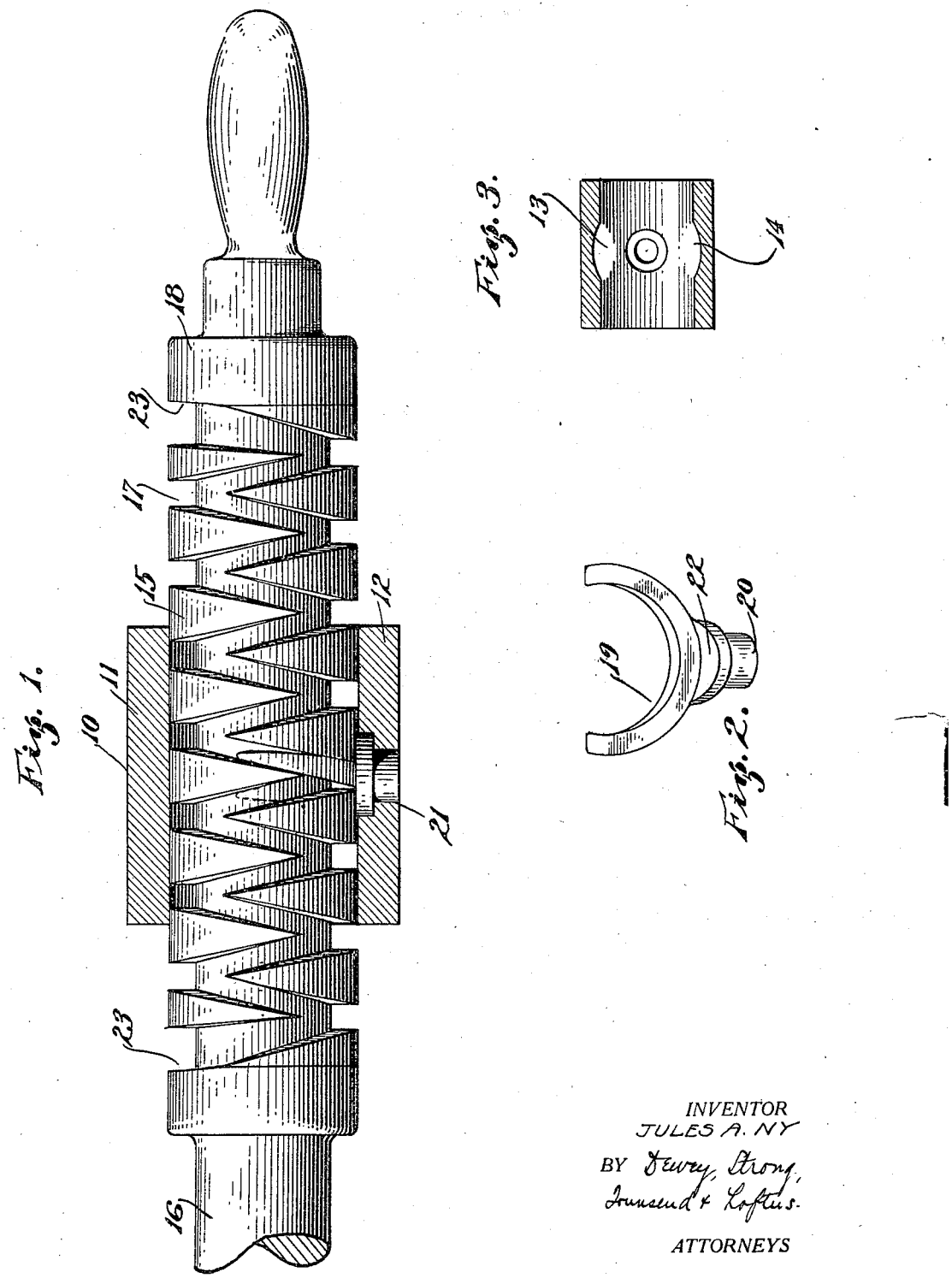
INVENTOR  
JULES A. NY  
BY Dewey, Strong,  
Townsend & Loftus.  
ATTORNEYS Patented Apr. 22, 1924.

1,491,491

UNITED STATES PATENT OFFICE.

JULES A. NY, OF SAN FRANCISCO, CALIFORNIA, ASSIGNOR OF ONE-HALF TO BERNHARDT R. BAUMAN, OF OAKLAND, CALIFORNIA.

MECHANICAL MOVEMENT FOR INKING ROLLS.

Application filed April 12, 1922. Serial No. 552,018.

*To all whom it may concern:*

Be it known that I, JULES A. NY, a citizen of the United States, residing in the city and county of San Francisco, and State of California, have invented new and useful Improvements in Mechanical Movements for Inking Rolls, of which the following is a specification.

This invention relates to a mechanical movement and particularly pertains to a reversing means for inking rolls.

At the present time it is common practice to provide the inking rolls of printing presses with reversing means whereby the roll will be caused to rotate and oscillate or vibrate longitudinally. These reversing mechanisms are, for the most part, difficult to manufacture and when they operate do not insure a smooth reversing movement and it is the principal object of the present invention to provide means whereby the reversing rolls may be driven in a continuous and non-vibrating fashion and at the same time will require a reversing mechanism which is decidedly simple in its construction and may be manufactured without difficulty.

The present invention contemplates the use of a spindle upon which double, reverse, threads are cut, such threads being designed to co-operate with crescent shaped member carried by a fixed nut, the opposite ends of the screw being so arranged as to permit the reversal of the spindle without any violent action.

The invention is illustrated by way of example in the accompanying drawing in which:

Figure 1 is a view transverse section showing a fragmentary portion of an inking roll spindle and further disclosing the provision of a nut thereto.

Fig. 2 is a view in perspective showing the crescent shaped thread member.

Fig. 3 is a view in plan showing the formation of the cap of the nut.

Referring more particularly to the drawing, 10 indicates a nut which is fixed to the frame of a printing machine or any other mechanism desired. This nut is formed in two halves, a removable cap 11 and a body portion 12. The body portion shown in Fig. 3 is provided with two diametrically opposite arcuate recesses 13 and 14 which recesses are used for a purpose we hereinafter explain. The bore of the nut is smooth and cylindrical to receive an extension 15 of a spindle 16. The spindle 16 carries an inking roller and it will be understood that it is desirable to vibrate this roller and rotate it so that the ink will be properly spread upon the platen of the press. The extension 15 of the spindle is formed by leaving a large cylindrical portion which is afterwards cut to provide reverse threads 17. These threads extend for a predetermined length and at their ends collars 18 are provided. The collars tend to facilitate in the rotating and reversing action of the mechanism but do not permit a dead stop in the movement of the roll.

Attention is directed to the formation of the threads which insures that the opposite side faces will be slightly tapered outwardly thus forming a thread groove having a flat bottom face and the tapered side faces. Into these grooves a crescent shaped driving member 19 extends. This member is more clearly shown in Fig. 2 as having a spindle 20 rotatably supported within an opening 21 in the bottom part of the nut and centrally thereof. A collar 22 is formed around the spindle and seats within a counterbore of the nut as clearly shown in Fig. 1. The horns of the spindle emanate from the upper face of this collar and are so designed to conform to the thread of the spindle and to seat therein, the opposite faces of the crescent being tapered so that the crescent member may be disposed at an angle to the longitudinal axis of the spindle. Attention is directed to the fact that the point of the crescent member extends above the longitudinal center of the spindle, and thus insures that there will be no lost motion at any time during the movement of the mechanism. For this reason the recesses 13 and 14 are provided in the nut 10. This makes it possible for the crescent member to easily rotate upon its spindle 20 as guided by the thread of the spindle and the faces of the collars 18.

Attention is directed to the fact that the end faces of the collars as indicated at 23 do not extend at right angles to the longitudinal axis of the spindle but are slightly tapered to form a continuation of the side surfaces of the thread, the taper being however at a slighter angle than the taper to the thread. This tends to produce a gradual reversal of the crescent member 19 and to permit its horns to extend into the reverse thread prior to their return movement along the spindle.

In operation of the present invention the spindle 16 is formed with the opposite thread 17. At the opposite ends of the thread section the collars 18 are pinned, these collars having first been formed with the tapered faces 23 which co-operate with the last of the threads and form a surface along which the crescent member may pass and within which it may be partially rotated. Due to this arrangement it is possible to mill perfect threads without the difficulty commonly experienced when a shoulder is formed upon the spindle in the place of the removable collar 18. It will also be evident that these collars may be adjusted on to the spindles so that the desired clearance will be provided and that the gradual movement of the crescent member will take place.

As the spindle is driven by a suitable driving mechanism it will be rotated and incident to its rotation it will be longitudinally vibrated, this vibration taking place as the spindle moves to and fro through the nut. When the opposite ends of the nut are reached the fork of the member 19 will pass from the end of the thread and strike the face 23 of a collar after which it will be gradually rotated and will then be directed into the reverse thread. Attention is directed to the fact that due to the length of the horns of the crescent these members will always be in engagement with one side of the thread surface and furthermore that the clearance or angle of the thread faces makes it possible for the crescent to adapt itself to the pitch angle of the thread without being bound or jammed.

It will thus be seen that the present invention makes it possible to economically and rapidly manufacture suitable vibrating spindle for inking rolls or other like devices which spindle will co-operate with a nut and will insure that a steady vibratory movement of the spindle will take place automatically.

While I have shown the preferred form of my invention as now known to me it will be understood that various changes in the combination, construction, and arrangement of parts may be made by those skilled in the art without departing from the spirit of the present invention as claimed.

Having thus described my invention, what I claim and desire to secure by Letters Patent, is:

1. In combination with an inking roll, means for producing vibration of the roll, an end section formed with intersecting right and left hand threads, a fixed nut through which said section may move and a thread engaging member carried by the nut and mounted to permit it to become adapted to the angle of the thread along which it is traveling and means at the opposite ends of the threads for directing said member from the thread extending in one direction to the thread extending in the opposite direction, said means comprising collars having angular guiding faces forming continuations of the terminating ends of the threads whereby the thread engaging member of the nut will be directed from the termination of one thread to the other, said guiding faces being disposed on an angle which is less than the angle of the threads so as to slow down the reciprocal movement of the inking roll at the end of each stroke and to permit reversal without violent action.

2. In combination with a printing roll adapted to rotate and vibrate, an extension at the end thereof formed with intersecting right and left hand threads, stop collars at the opposite ends of said threads, a nut through which said extention reciprocates, a crescent shaped thread engaging member carried by the nut and pivoted thereto, said member adapted to embrace the extension for a distance greater than one-half the circumference of the threaded member.

3. In combination with rotating and vibrating printing roll, an end extension therefor in longitudinal alignment with the spindle of the roll, said extension being of larger outside diameter than the outside diameter of the spindle, right and left hand intersecting threads cut upon said enlarged extension and having a bottom diameter no less than the outside diameter of the spindle said threads presenting inclined side faces and stop collars fixed to the extension at opposite ends of the threaded portion thereof, and having reverse guide faces formed thereon in continuation of the ends of the threads and which guide faces present an angle less than that presented by the threads.

JULES A. NY.